United States Patent [19]

Shibata et al.

[11] Patent Number: 5,244,727
[45] Date of Patent: Sep. 14, 1993

[54] REFRACTORIES FOR USE IN FIRING CERAMICS

[75] Inventors: Kenichi Shibata; Kohichi Kimura; Tomohiko Hara; Tatsuo Takagi; Yoshihiro Goto, all of Kanagawa, Japan

[73] Assignee: Nichias Corporation, Tokyo, Japan

[21] Appl. No.: 877,376

[22] Filed: Apr. 29, 1992

Related U.S. Application Data

[63] Continuation of Ser. No. 417,155, Oct. 4, 1989, abandoned.

[30] Foreign Application Priority Data

Oct. 11, 1988 [JP] Japan .................. 63-253833

[51] Int. Cl.$^5$ .................. B32B 5/16; D02G 3/00; C04B 35/02
[52] U.S. Cl. .................. 428/329; 428/328; 428/333; 428/338; 428/364; 428/401; 428/689; 501/95; 501/153
[58] Field of Search .............. 428/401, 364, 328, 329, 428/689, 333, 338; 501/95, 153

[56] References Cited

U.S. PATENT DOCUMENTS

| | | | |
|---|---|---|---|
| 3,669,719 | 6/1972 | Doede et al. | 428/462 |
| 4,121,082 | 10/1978 | Harrington et al. | 427/34 |
| 4,121,083 | 10/1978 | Smyth | 427/34 |
| 4,173,685 | 11/1979 | Weatherly | 427/423 |
| 4,357,387 | 11/1982 | George et al. | 428/285 |
| 4,671,911 | 6/1987 | Garnier et al. | 428/334 |
| 4,849,382 | 7/1989 | Shibata et al. | 501/95 |

FOREIGN PATENT DOCUMENTS

2610923 2/1988 France.
62-283885 12/1987 Japan.

OTHER PUBLICATIONS

English Translation of 62-283885 published Dec., 1987, pp. 1-15.
JP-A-1148765 (Nichias Corporation), Jun. 12, 1989, Abstract.
JP-A-59088378 (Toshiba Ceramics K.K.) May 22, 1984, Abstract.
JP-A-53043713 (Ibigawa Electric K.K.) Apr. 20, 1978, Abstract.
Chemical Abstracts, vol. 108, No. 14, Apr. 1988, A. Hajime et al. "Manufacture of Fiber-Reinforced Refractory Composite" p. 341; Ref. No. 117698Y.

*Primary Examiner*—Jenna L. Davis
*Assistant Examiner*—Terrel Morris
*Attorney, Agent, or Firm*—Sughrue, Mion, Zinn, Macpeak & Seas

[57] ABSTRACT

A refractory for use in firing ceramics has a ceramic coating applied by plasma spraying onto the surface of a heat-resistant lightweight shaped article containing heat-resistant lightweight shaped article containing heat-resistant inorganic fibers. The shaped article is composed of highly aluminous short fibers not longer than 2,000 μm or a mixture thereof with an aluminous refractory powder as bound to each other by means of aluminous binder, the shaped article not containing free silica.

4 Claims, No Drawings

REFRACTORIES FOR USE IN FIRING CERAMICS

This is a continuation of application Ser. No. 07/417,155 filed Oct. 4, 1989 now abandoned.

BACKGROUND OF THE INVENTION

The present invention relates to refractories suitable for use as auxiliary tools to support the work being fired to fabricate a variety of ceramic products including ceramic electronics parts (e.g. ceramic capacitors, piezoelectric devices and IC packages) and ceramic sliding materials.

Refractories for use as auxiliary tools in the process of firing ceramics are required to have heat resistance and mechanical strength that are appropriate for specific conditions of use. On the other hand, such refractories should be heat-resistant at the lightest weight in order to reduce the thermal energy they consume in the furnace and to shorten the durations of time required for temperature elevation and cooling, thereby reducing the energy cost while increasing the production rate. Besides these requirements, there is a characteristic need for the absence of reactivity with the work or ceramics that are to be fired. If the auxiliary tool or support reacts with the work at the interface, disadvantages such as fusion and deterioration of performance due to compositional changes will occur. In order to avoid this problem, it is desired that the auxiliary tool does not enter into any kind of reaction with the work under the firing conditions being employed. It is also desired that the surface of the auxiliary tool is as smooth as possible in order to insure that the surface properties of the work will not be damaged by contact with the support. These requirements have become increasingly stringent for auxiliary tools that are employed in the firing of modern miniature precision-molded electronics parts.

Refractories fabricated by shaping mixtures of refractory particles and heat-resistant inorganic fibers using inorganic binders (as described in JP-A-63-206367 and 59-88378 (the term "JP-A" as used herein means an "unexamined published Japanese patent application") are lightweight, exhibit high heat resistance and have sufficient strength to support lightweight work such as electronics parts. However, these refractories are somewhat poor in surface properties such as smoothness and reactivity. Furthermore, they are porous and gas-permeable, so that they tend to deteriorate if hot corrosive gases get into their bulk during use.

Improvements on the surface properties of lightweight refractories for use as auxiliary tools in firing ceramics are described in JP-A 62-216974 and 62-283885. According to their teachings, a zirconia or alumina coating is applied onto refractories to improve their surface properties.

SUMMARY OF THE INVENTION

The prior art surface coatings described above are formed by the following procedure: a zirconia or alumina powder as mixed with a binder is applied by spraying, brushing or some other methods and the resulting coating is dried and fired to form a ceramic body. The coatings formed by this process, however, have had the following problems. First, the coating layers are not dense enough to insure complete prevention of reaction with the work. Second, the coating layers do not adhere strongly to the substrate and can separate or crack during use on account of thermal expansion mismatch.

An object, therefore, of the present invention is to provide a lightweight refractory for use in firing ceramics that is provided with a coating from which the aforementioned defects encountered in the prior art products are absent.

DETAILED DESCRIPTION OF THE INVENTION

The refractory for use in firing ceramics that is provided by the present invention has a ceramic coating applied by plasma spraying onto the surface of a heat-resistant lightweight shaped article containing heat-resistant inorganic fibers.

Particularly good characteristics are exhibited if the shaped article described in commonly assigned Japanese Patent Application No. 62-307453 is used as the substrate; that is, a porous shaped article that is composed of highly aluminous short fibers not longer than 2,000 $\mu$m or a mixture thereof with an aluminous refractory powder as bound to each other by means of an aluminous binder and which does not contain free silica. According to the present invention, a ceramic coating is applied to the surface of this substrate by plasma spraying.

In the refractory of the present invention, the plasma-sprayed coating is preferably formed as a layer in thickness of ca. 50–300 $\mu$m that is made of alumina, zirconia, magnesia, titania, mullite or some other suitable ceramic material. Coating layers thinner than 50 $\mu$m are not highly durable whereas those which are much thicker than 300 $\mu$m tend to separate from the substrate too easily. The coating layer need not be formed on the entire surface of the refractory substrate but may be selectively formed in those areas the surface of which needs to be modified for the reasons already stated in connection with the prior art.

Production of the refractory of the present invention starts with the fabrication of an inorganic fibrous lightweight shaped article by a known method. Preferred examples of the heat-resistant inorganic fibers to be used in fabricating the shaped article include aluminosilicate fibers, polycrystalline fibers and polycrystalline mullite fibers. Inorganic fibers are mixed well with suitable amounts of a refractory powder (e.g. alumina, alumina silica, zirconia, magnesia or titania) and an inorganic binder (e.g. silica sol or alumina sol) and the mixture is molded under such conditions that the finally obtained shaped article will have a bulk specific gravity of 0.5–2.0. The molding is then fired at 1,400°–1,800° C. to produce a lightweight shaped article.

If the shaped article described in commonly assigned Japanese Patent Application No.62-307453 which is chiefly composed of highly aluminous short fibers not longer than 2,000 $\mu$m is to be used as the substrate, it may be fabricated by the following procedure. Polycrystalline aluminous short fibers not longer than 2,000 $\mu$m which are to be used as the chief component are prepared by cutting polycrystalline aluminous fibers which an appropriate device such as a wet or dry grinder. If the fiber length is too short, it is difficult to obtain a product that is of low specific gravity and which yet exhibits high strength and endurance. Therefore, the lower limit of the fiber length is desirably ca. 20 $\mu$m. A particularly preferred fiber length is in the range of ca. 50–500 $\mu$m, with the average being ca. 200 $\mu$m. The thickness of fibers is not limited to any particular value but is desirably in the range of ca. 1–5 $\mu$m. If necessary, high-purity alumina powders such as fired alumina powder, electrofused alumina powder and aluminum hydroxide may be incorporated in the polycrystalline aluminous short fibers. Excessive use of the polycrystalline aluminous short fibers results in dense products which are poor in heat insulating property and ensurance. Aluminous long fibers cut to lengths of 1–40 mm may also be incorporated in small amounts. An aluminous binder is desirably used as a molding binder and suitable examples include colloidal alumina, aluminum sludge (the aluminum hydroxide gel precipitated in the alumilite process) and the aluminum hydroxide gel formed by allowing an alkali to act on aluminum sulfate. The amount of binder used (in terms of $Al_2O_3$) is desirably in the range of 2–30 wt % of the mixture of alumina fibers and refractory powder. Using an excess amount of binder causes the same disadvantages as in the case where the refractory powder is used in excess amount. Firing after molding is effected at 1,400°–1,800° C. until free silica becomes substantially absent and t the extent that allows the binder to cure. In the process of firing, the silica present in a small amount (usually ca. 1–5 wt %) in the aluminous short fibers reacts with the surrounding alumina to form mullite whereas the remaining alumina portion is stabilized as corundum and remains in the final product without causing any substantial change in the fibrous state.

That part of the surface of the resulting lightweight shaped article which contacts the work to be fired is rendered as smooth as possible by mechanical grinding and polishing. A ceramic coating is then applied to the smoothed surface by plasma spraying. Stated more specifically, the fine powder of a ceramic material such as alumina, zirconia, magnesia or titania is plasma-sprayed in the usual manner to deposit a uniform film in a thickness of ca. 50–300 µm, more preferably, 70–200 µm.

When the lightweight refractory of the present invention is used as a support of ceramic to be fired, the plasma-sprayed coating which is dense and adheres strongly to the substrate prevents it not only from reacting with the work but also from being permeated by corrosive gases that evolve from the work. Thus, the refractory is less likely to cause deterioration of the work than conventional types of lightweight refractories that have been used as supports of ceramics to be fired. Further, the refractory itself is less prone to deterioration. In particular, the refractory using as the substrate a lightweight shaped article composed of fine alumina fibers has the advantage that it can be used in a wider range of applications than conventional silica-containing aluminous lightweight refractories while displaying better durability at elevated temperatures since free silica which has reactivity and volatility is substantially absent from the substrate. Further, the unique structure which is chiefly composed of aluminous fibers cut to very short lengths provides greater ease in cutting or otherwise machining the substrate. Since a highly smooth surface can be readily produced by grinding and polishing operations prior to plasma spraying, a surface coating layer that is dense and highly smooth can be formed by subsequent plasma spraying.

EXAMPLES

The following examples and comparative examples are provided for the purpose of further illustrating the present invention.

EXAMPLE 1 and COMPARATIVE EXAMPLE 1

Seventy parts by weight of polycrystalline alumina fibers and 30 parts by weight of an alumina powder were charged into water and mixed therein. After adding 5 parts by weight of alumina sol, the mixture was stirred and press-molded while it was dehydrated by suction. The shaped article was dried with hot air and thereafter fired at 1,500° C. for 3 h to obtain a lightweight refractory sheet having a bulk density of 0.9 g/cm³. After grinding and polishing the surface of the sheet, a zirconia coating was deposited in a thickness of 150 µm by plasma spraying so as to obtain a sample of the lightweight refractory of the present invention.

As a comparison, a zirconia powder containing a binder was spray-coated onto the refractory sheet, dried and then fired at 1,500° C. to prepare a refractory having a zirconia coating in a thickness of 150 µm.

The two refractory samples were used as a support in the firing of a green work for barium titanate based ceramic capacitors at 1,350° C. The work did not adhere to either sample. The sample of the present invention produced no visible abnormality in its appearance even after 50 cycles of use, but the comparative sample developed warpage after 10 cycles and cracking after 25 cycles. The profiles of the changes that occurred in the flexural strength of the two samples were as follows:

|  | Sample of the invention (kgf/cm²) | Comparative sample (kgf/cm²) |
|---|---|---|
| Initial | 120 | 115 |
| 10 cycles | 115 | 85 |
| 25 cycles | 110 | 50 |
| 50 cycles | 100 | — |

EXAMPLE 2 and COMPARATIVE EXAMPLE 3

Thirty parts by weight of polycrystalline alumina fibers and 70 parts by weight of an alumina powder were charged into water and mixed therein. After adding 15 parts by weight of silica sol, the mixture was stirred and press-molded while it was dehydrated by suction. The shaped article was dried with hot air and thereafter fired at 1,600° C. for 3 h to obtain a lightweight refractory sheet having a bulk density of 1.2 g/cm³. After grinding and polishing the surface of the sheet, an alumina coating was deposited in a thickness of 100 µm by plasma spraying so as to obtain a sample of the lightweight refractory of the present invention.

As a comparison, an alumina powder containing a binder was spray-coated onto the refractory sheet, dried and then fired at 1,500° C. to prepare a refractory having an alumina coating in a thickness of 100 µm.

The two refractory samples were used as a support in the firing of a green work for alumina-based IC packages at 1,400° C. The work did not adhere to the sample of the present invention and no abnormality was detected in its appearance even after 50 cycles of use. On the other hand, the work adhered to the comparative sample from the beginning, making its further use impossible.

The profiles of the changes that occurred in the flexural strength of the two samples were as follows:

|  | Sample of the invention (kgf/cm²) | Comparative sample (kgf/cm²) |
| --- | --- | --- |
| Initial | 150 | 145 |
| 10 cycles | 135 | — |
| 25 cycles | 125 | — |
| 50 cycles | 120 | — |

EXAMPLE 3 and COMPARATIVE EXAMPLE 3

Thirty parts by weight of polycrystalline alumina fibers and 70 parts by weight of an alumina powder were charged into water and mixed therein. After adding 5 parts by weight of alumina sol, the mixture was stirred and press-molded while it was dehydrated by suction. The shaped article was dried with hot air and thereafter fired at 1,650° C. for 3 hours to obtain a lightweight refractory sheet having a bulk density of 1.2 g/cm³. After grinding and polishing the surface of the sheet, an alumina coating was deposited in a thickness of 100 μm by plasma spraying so as to obtain a sample of the lightweight refractory of the present invention.

As a comparison, instead of the plasma coating of alumina in the foregoing method, an alumina powder containing a binder was spray-coated onto the refractory sheet, dried and then fired at 1,500° C. to prepare a refractory having an alumina coating in a thickness of 100 μm.

The two refractory samples were used as a support in the firing of a green work for alumina-based IC packages at 1,600° C. The work did not adhere to the sample of the present invention and no abnormality was detected in its appearance even after 50 cycles of use. On the other hand, the work adhered to the comparative sample from the beginning, making its further use impossible.

The profiles of the changes that occurred in the flexural strength of the two samples were as follows:

|  | Sample of the invention (kgf/cm²) | Comparative sample (kgf/cm²) |
| --- | --- | --- |
| Initial | 140 | 135 |
| 10 cycles | 130 | — |
| 25 cycles | 125 | — |
| 50 cycles | 120 | — |

We claim:

1. A refractory for use in firing ceramics comprising a ceramic coating of a thickness of 70–200 μm applied by plasma spraying onto the surface of a porous shaped article having a bulk specific gravity of 0.5–2.0, said porous shaped article being composed of highly aluminous short fibers having lengths from about 50 to 500 μm or a mixture thereof with an aluminous refractory powder as bound to each other by means of an aluminous binder, said shaped article containing substantially no free silica.

2. A refractory according to claim 1 wherein said ceramic coating is made of alumina.

3. A refractory according to claim 1, wherein said refractory can withstand firing temperatures of at least 1,350° C.

4. A refractory according to claim 3, wherein said refractory supports a barium titanate component during said firing without adhering to said barium titanate component.

* * * * *